July 22, 1969  R. P. BROWN ETAL  3,457,006
PROJECTION STATION
Filed Dec. 3, 1965  3 Sheets-Sheet 2

INVENTORS.
RICHARD P. BROWN
JOSEPH H. LANCOR, JR.
BY ARTHUR RAK

ATTORNEYS.

July 22, 1969   R. P. BROWN ET AL   3,457,006
PROJECTION STATION
Filed Dec. 3, 1965   3 Sheets-Sheet 3
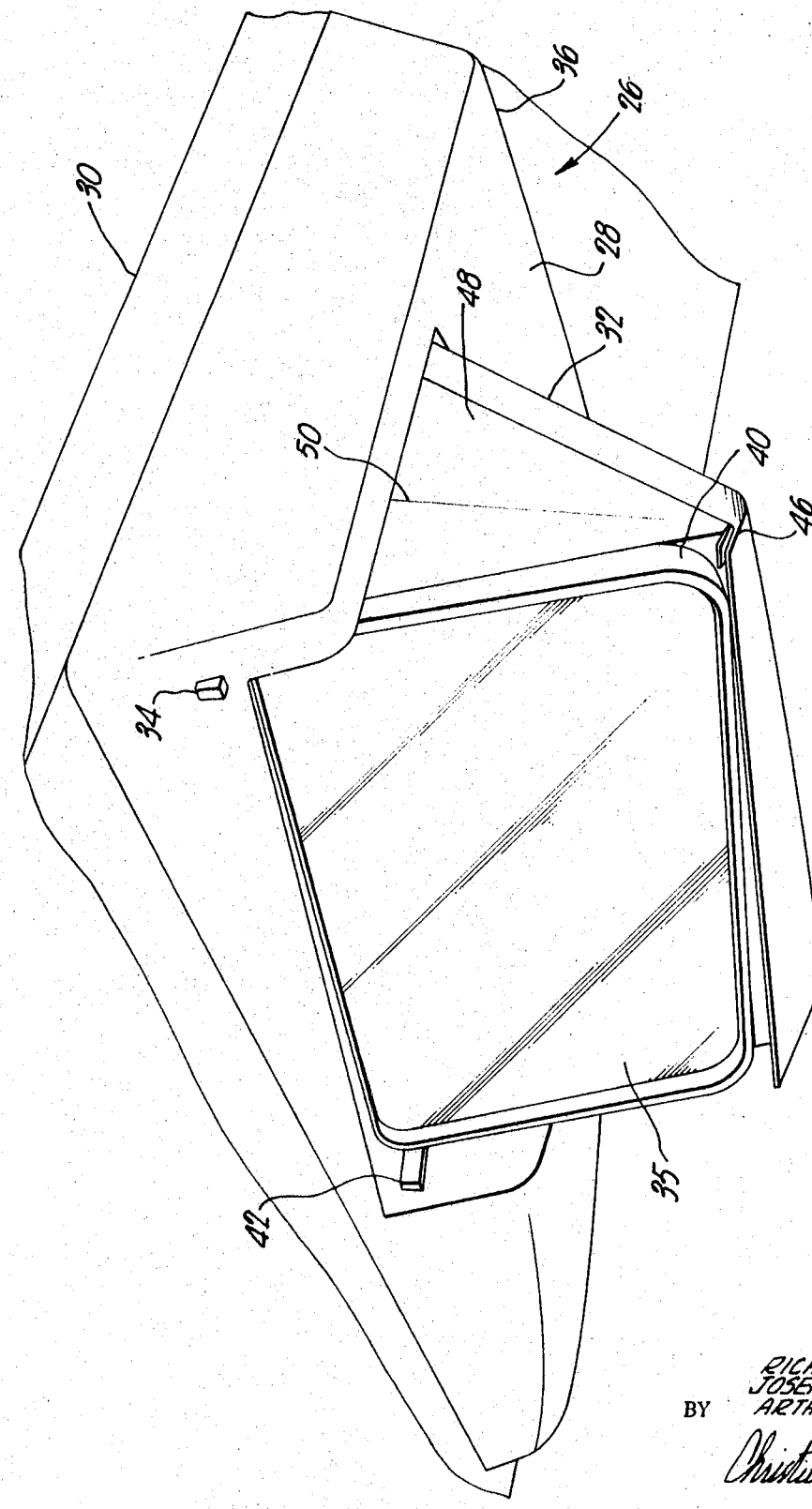
FIG_3
INVENTORS
RICHARD P. BROWN
JOSEPH H. LANCOR, Jr
ARTHUR RAK
BY
Christie, Parker & Hale
ATTORNEYS.

United States Patent Office 3,457,006
Patented July 22, 1969

3,457,006
PROJECTION STATION
Richard P. Brown, Monrovia, Joseph H. Lancor, Jr., Arcadia, and Arthur Rak, Altadena, Calif., assignors, by mesne assignments, to Bell & Howell Company, Chicago, Ill., a corporation of Illinois
Filed Dec. 3, 1965, Ser. No. 511,487
Int. Cl. G03b 29/00
U.S. Cl. 352—132                                 8 Claims

ABSTRACT OF THE DISCLOSURE

A station for use in a passenger enclosure motion picture film projection apparatus. The station includes a motion picture projector mounted on an overhead structure and oriented so as to direct projections to a retractable screen assembly housed in an enclosure located below the projector. The screen is lowered from the housing to a display position for viewing and is illuminated by the projector by backlighting with projections reflected from a mirror properly oriented within the unit. Interlock means for disabling the projector lamp when the viewing screen assembly is not in use and lightshielding means for preventing undesirable glare and ingress of ambient light to the assembly are also provided.

---

Figure 1:
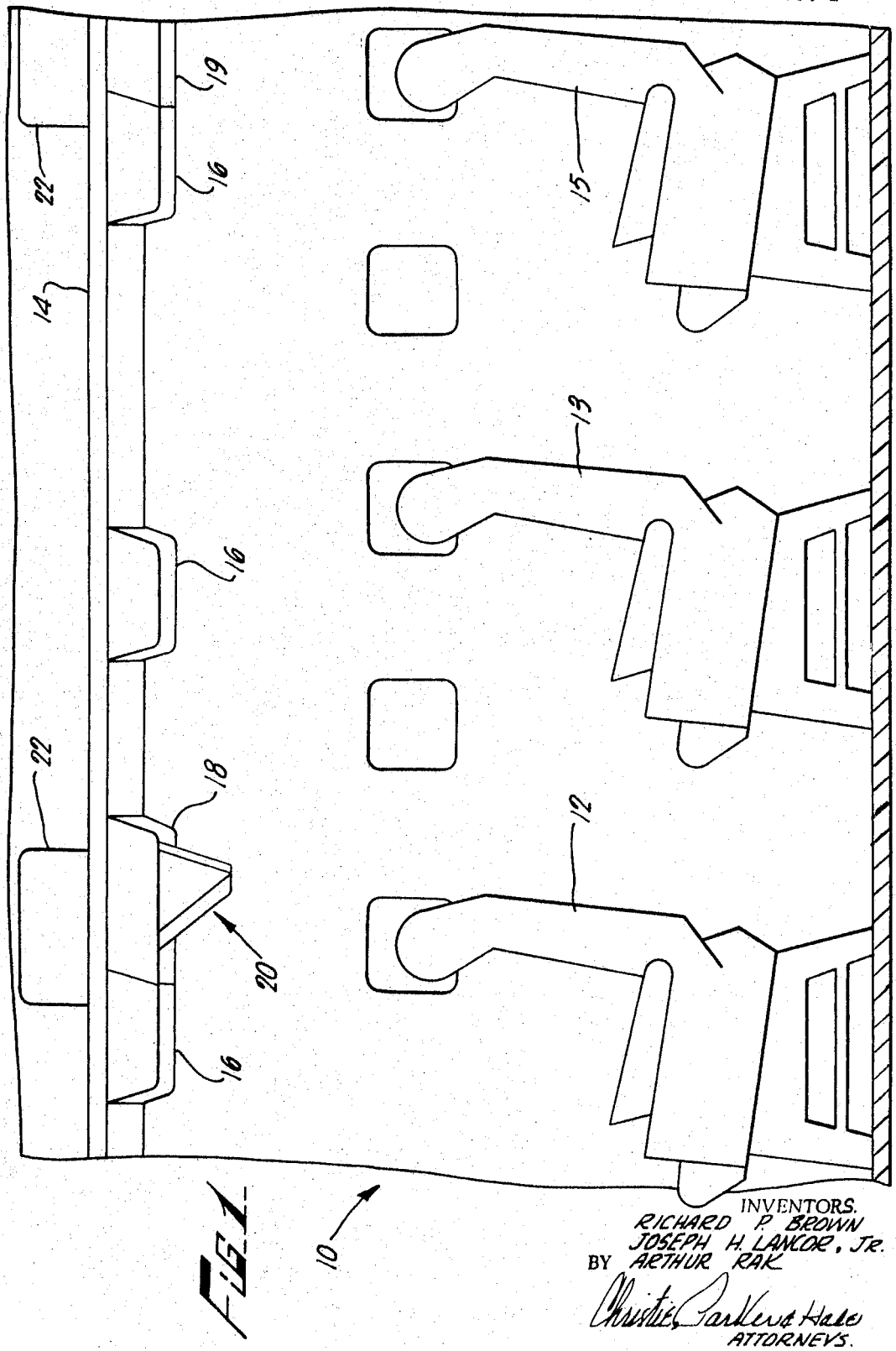

This invention relates to motion picture entertainment systems and in particular to an individual projection station for use in such systems.

In the travel industry and, in particular, the air travel portion of the industry, various systems have been introduced for providing entertainment for the passengers. These systems have taken various forms ranging from a relatively straightforward system utilizing a single projector and motion picture screen serving all or a substantial portion of the passenger enclosure to individual video tape monitors spaced at various intervals throughout the enclosure. In the former, the entertainment media is recorded on motion picture film and projected by the motion picture projector onto the screen as is done in conventional motion picture theatres and in home entertainment systems. In the latter system, the motion picture entertainment is normally transcribed onto magnetic tape and the tape placed on a video tape reproducing unit on board the aircraft. When the unit is operated, the signals picked up from the tape are transmitted electrically to the various monitors in the enclosure.

An alternative system to the two systems described immediately above is provided in copending application, Ser. No. 485,768, filed Sept. 8, 1965, now U.S. Patent No. 3,379,488, issued Apr. 23, 1968. In general, this system provides a multiple projector system utilizing a motion picture film wherein the film is directed from a supply reel station serially through several projection stations spotted at various intervals in the cabin and returned to a takeup reel station. The projection stations comprise motion picture projectors for detecting the images recorded on the film and projecting them onto projection screens with which the projectors are associated. The result is a series of instantaneously differing projections at the various stations, a particular scene appearing consecutively at station after station as the film advances from the supply to the take up.

The present invention is concerned with the individual projection stations for use in the entertainment system described in that copending application and comprises a film projector and film transport mechanism mounted on a support, the projector including a projection lamp and a film aperture. A viewing screen is disposed below the projector and located in a predetermined position relative to the projector. The screen is illuminated by means provided for directing illumination from the lamp through the film aperture and means for casting this illumination on the screen.

In a typical aircraft cabin installation, the projector is mounted on top of the rack which is normally located along each cabin wall above the seating locations. The viewing screen is depended below the rack with a suitable aperture being provided in the rack between these two components to accommodate the necessary light transmission.

As contemplated for a motion picture projection station intended for use in airplanes, the viewing screen assembly is mounted on a retractable frame which can be swung up into a housing having the configuration of the passenger service units which are typically provided on the underside of the overhead rack in an airplane cabin. By proper orientation of the various parts and the provision of a suitable cover, the entire assembly can be made to blend with the decor of the airplane cabin and to provide the important advantage of being removable from sight when one or more of the stations are not in use. In this way, the screens are extended or retracted depending upon whether or not the system is in use and whether the passengers associated with a particular station are interested in watching. Inconvenience and distraction of the passengers who may not desire to observe the motion picture screen is minimized and the screens are effectively removed from the cabin when not in use so as to not obstruct ingress and egress from the setaing locations.

A further advantage is that by virtue of the extend-observe and retract-not observe mode of operation, an interlock can be provided between the screen assembly and the projection lamp to positively disable the projection lamp when the station is not in use to prevent possible damage to film. In the preferred embodiment the screen is backlighted and is located at a relatively short optical distance from the projector thereby providing an image of clarity and sharpness on the viewing screen. This arrangement means it is possible to provide high-intensity illumination of the screen with a relatively low intensity projection lamp permitting comfortable viewing under ambient or standard cabin lighting conditions.

These and other advantages will be better understood by reference to the following figures in which:

FIG. 1 is a view of a section of a typical airplane cabin depicting a pair of projection stations and illustrating the extended and retracted positions of the projection screen, FIG. 2 is a perspective view of the viewing screen assembly in the retracted position, FIG. 3 is a perspective view of a viewing screen in the extended position, FIG. 4 is a diagrammatic illustration of the relationship of projector and transport mechanism, film, mirror, and backlighted projection screen, and FIG. 5 is a plan view of the mirror which is interposed in the optical path between the projector and the backlighted screen.

Although not limited to such an application, the present invention will be described as it is used in a section of a typical airplane cabin such as that shown in FIG. 1. Depicted therein is a section 10 of the starboard side of the aircraft. Several rows of seats 12, 13, and 15 are located on one side of an aisle beneath a support or overhead rack 14 which is normally provided in the airplane cabin for storing pillows and blankets, and also for supporting units containing lights, stewardess call bells, air vents and oxygen masks. Such units are called passenger service units and are normally located on the underside of support 14 directly above each row of seats.

As shown in FIG. 1, two of the service units have housings 18 and 19 respectively located adjacent to them. These housings contain a projection screen assembly 20. Associated therewith and located above the screen assembly on top of the overhead rack 14 are other housings 22 in which a film projector and transport mechanism is located. Normally an arrangement similar to that shown in FIG. 1 is multipled throughout the enclosure, the number of rows and seats associated with each screen and projector varying depending upon the specific requirements of each application.

Above row 12, the screen assembly is shown in an extended position, such that the viewers in rows 13 and 15 can observe the presentation displayed thereon. The screen in housing 19 is adapted for viewing by rows (not shown) behind row 15 while passengers seated in row 12 are associated with a screen (not shown) located forward of assembly 20.

A perspective view of a projection screen assembly 26 in the retracted position is shown in FIG. 2. The assembly shown in this figure is adapted for use on the port side of the aircraft. As shown in that figure the assembly comprises a housing 28 suspended from a rack or support 30 which is provided with a cut-out portion or door 32 which fits flush with the screen and passenger service unit housings when the screen is in the retracted position. A mechanical release or catch mechanism 34 is provided for unlocking the door 32 preparatory to lowering and extending a screen for viewing. In the closed position the assembly has the appearance of an oversize service unit and as provided integrates into a package that can be conveniently removed from sight and prevented from causing obstructions in the cabin.

The projection screen assembly 26 is shown in its fully extended position in FIG. 3. When the mechanical latch mechanism 34 is operated, the door 32 is lowered and swung toward end 36 of the screen housing. A screen 35 is spring biased against door 32 and snaps into its fully extended operating position under the influence of the spring bias when door 32 is unlocked and lowered from housing 28. FIG. 5A illustrates one means of spring biasing the screen 35 relative to door 32. A torsion spring 43 is located concentrically with a hinge 44. When door 32 is lowered to its full extension, spring 43 causes screen 35 to move away from the door 32 until contact is made with a bumper spring 47 (FIG. 4) located adjacent the front of housing 28.

With screen 35 in the operating position, the housing door 32 is now extended outwardly and downwardly from the assembly 26 and forms approximately a 135° angle with the bottom surface 38 of the housing. The screen 35 is mounted in a frame 40. Provided at the upper corners of frame 40 are a pair of pins 54 (see FIG. 4) which engage and travel in tracks 42 provided within the housing of the assembly to guide the motion of the frame in extension and retraction of assembly 26.

To close the screen the pins 54 at the top 57 of frame 40 are slid in tracks 42 toward the door 32. In closing, frame 40 pivots about a pair of hinges 44 (see FIG. 4) located at the exterior edges of the base of the frame 40. When the screen and frame are approximately parallel with the door 32, the assembly is raised and pivots about a hinge 58 (see FIG. 4) located within housing 28 at the point where door 32 intersects the bottom plane 38 of the housing. When door 32 is flush with the contours of housing 28, the latch mechanism 34 engages the frame 40 and holds the assembly in this position until it is ready for subsequent extension. To open the screen, the reverse of the preceding operation is performed.

A skirt or partition 48 is provided between the frame 40 and door 32 on at least the inboard side of the unit so that the unit presents a continuous exterior surface and passengers cannot gain access to the area between the screen and the door 32 when the unit is in the extended position. This skirt 48 is fabricated of a pliable material such as vinyl so that when the screen is folded back preparatory to closing the unit the skirt folds along a line such as crease 50 and lies flat against the interior side of door 32. Partition 48 also serves as a light shield for preventing interference with the images projected on the backlighted screen 35. The recessed location of screen 35 relative to frame 40 also serves to create a light shield around the periphery of the screen.

The relationship of the screen and its associated projector is shown in FIG. 4. As shown therein the screen assembly 26 is in its fully extended position. FIG. 4 also illustrates the hinges and tracks referred to in conjunction with the discussion relating to extending and retracting the viewing screen assembly 26. A pin 54 provided at the top 57 of the frame 40 fits into a slot or track 42 and is slid toward a pair of hinges 58 provided at the rear of the assembly. The screen and frame rotate about a pair of hinges 44 until the frame is approximately in contact with a mirror 62 provided at the back of the housing. When the frame 40 is flush against mirror 62, the entire unit can be swung upwardly about hinges 58 until door 32 is flush with the service unit housing 28.

A film projector and transport mechanism 70 is disposed above an overhead support 14 and is located relative to a passage 74 in the support such that an optical path 73 is established between the projector and screen 35. Optical path 73 is established through one or more projector lenses 76 and the mirror 62. Film 78 from a preceding station records through duct 80 around a guide roller 82 and into the projector mechanism 70. Upon emergence from the projector, the film 78 passes around another guide roller 83 and over a spring biased roller 79 which together with appropriate control means maintains a contant length of film between stations. From roller 79 the film extends around another guide roller 84 and back into duct 80 leading to the next succeeding station. As the film passes through projector 70, the images recorded on the film are illuminated when the projection lamp is energized and are directed by lens 76 downwardly through passage 74 toward mirror 62. These illuminations are then cast or reflected from mirror 62 to backlight screen 35 providing the presentation which is seen by the passengers associated with that screen assembly. The aforementioned copending application contains a more detailed description of the projector and transport mechanism and the system in which it is used.

An interlock 88 provided in track 42 is connected by suitable electric means to the projection lamp in projector mechanism 70. The function of this interlock is to provide a positive means for disabling the projection lamp when the screen is in the retracted position. As can be seen, when pin 54 is slid along track 42 toward mirror 62, interlock 88 is operated and the projection lamp in projector mechanism 70 is thereby disabled. Film may still pass through projector 70 as it traverses the system but is not illuminated by light from this particular projector. When the viewing screen assembly is opened and extended to the operating position, the interlock is again operated closing a power circuit and energizing the lamp.

A plan view of a mirror 86 is shown in FIG. 5. The shape or outline of the mirror is essentially trapezoidal and is selected in such a configuration in order to accommodate the illumination from the projector which is in the form of a trapezoid 89. The mirror 86 can be provided by conventional silvering of various types of material, the preferred embodiment being an aluminized plastic sheet such as Lucite or Lexon.

The projection screen is preferably farbricated from a panel viewing screen material such as light polarizing plexiglass or the like. A plate of glass or plastic material having a plurality of microlenses precisely cast and resin bonded to one surface of the panel has been found to be particularly effective in this application. The use of the technique of backlighting of a Lenscreen panel is preferred because it provides a means of locating the screen relatively close to a projector permitting the use of a low wattage projection lamp while not sacrificing image intensity on the screen.

The projection station of this invention is readily adaptable to a variety of environments, in particular, the passenger enclosure of common carriers. The unique design permits viewing in ambient cabin lighting, with images of a sharpness and clarity not heretofore achieved. The retractability means minimum passenger obstruction and distraction when the station is not in use and provides a unique compact package which is easily assimilated into the decor of the environment in which it is located.

What is claimed is:

1. A station in a motion picture film projection apparatus comprising:
    a motion picture projector, the projector including a projection lamp and means for moving motion picture film past the lamp for illuminating and projecting images recorded on the film;
    means for supporting the projector in a predetermined position;
    a housing suspended from said supporting means adjacent to said projector, the housing having a door movable downwardly relative to the housing under the influence of gravity;
    a frame located in the housing and movable responsive to movement of the housing door;
    means for unlatching the door from the housing to allow the frame to drop into an operating position;
    a translucent projection screen mounted on said frame;
    a mirror mounted on said door, the screen and mirror being oriented when said frame is extended such that the projected images are reflected by the mirror and backlight the projection screen;
    at least one side-enclosing collapsible partition attached between the frame and the door for preventing ingress of light therebetween; and
    switch means operable responsive to operation of the door and frame for opening and closing an electrical energizing circuit to the projection lamp.

2. A station according to claim 1 wherein the collapsible partition has a folding axis, the partition being adapted to pivot about the folding axis when the partition, screen and mirror are moved relative to the housing.

3. A station according to claim 2 including spring means biasing the frame relative to the housing door for urging the frame away from the door.

4. A station according to claim 3 including a pair of collapsible partitions located at the side of and attached to the frame and the door in opposed relationship to one another, the partitions acting as a stop for the frame at its fully extended position.

5. A station according to claim 4 wherein the screen has a plurality of microlenses disposed on the surface thereof opposite the mirror.

6. A station according to claim 5 wherein the projection screen is provided with a light shield around the periphery thereof for reducing stray light reflection onto the screen.

7. A station in a multi-station airplane motion picture film projection system comprising:
    a rack located over passenger seating locations;
    a motion picture projector mounted on the rack, the projector including a projection lamp and means for moving motion picture film past the lamp for illuminating and projecting images recorded on the film;
    a housing suspended from said rack adjacent to said projector;
    a frame located in the housing;
    means for extending the frame from the housing; and
    a translucent projection screen and a mirror mounted on said frame, the screen and mirror being oriented when said frame is extended such that the projected images are reflected by the mirror and backlight the projection screen.

8. A station according to claim 7 wherein:
    latch means are provided for unlocking the frame from the housing;
    interlock means are provided for energizing the projection lamp when the screen is in the fully extended position; and
    spring means are provided for biasing the screen relative to the mirror.

References Cited

UNITED STATES PATENTS

| 1,670,629 | 5/1928 | McBride. |
| 1,987,710 | 1/1935 | Robbins. |
| 2,066,158 | 12/1936 | Patterson _____ 352—132 |
| 2,438,022 | 3/1948 | Rundle. |
| 3,262,358 | 7/1966 | Hicks et al. |
| 3,311,017 | 3/1967 | Eckholm _____ 352—690 X |
| 3,277,781 | 10/1966 | Moutray _____ 350—123 |

FOREIGN PATENTS

| 924,517 | 3/1947 | France. |
| 293,579 | 4/1965 | Netherlands. |

JULIA E. COINER, Primary Examiner

U.S. Cl. X.R.

350—124; 352—104; 353—13, 77